(12) United States Patent  
Okada

(10) Patent No.: US 9,083,185 B2  
(45) Date of Patent: Jul. 14, 2015

(54) POWER SOURCE DEVICE, ELECTRONIC DEVICE, IMAGE FORMING APPARATUS, AND POWER SOURCE CONTROL METHOD

(71) Applicant: Norikazu Okada, Kanagawa (JP)

(72) Inventor: Norikazu Okada, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 356 days.

(21) Appl. No.: 13/748,094

(22) Filed: Jan. 23, 2013

(65) Prior Publication Data

US 2013/0188979 A1    Jul. 25, 2013

(30) Foreign Application Priority Data

Jan. 23, 2012  (JP) ................................. 2012-011215

(51) Int. Cl.
  *H02J 4/00*    (2006.01)
  *G03G 15/00*   (2006.01)
  *H02J 9/00*    (2006.01)
  *H01H 33/59*   (2006.01)

(52) U.S. Cl.
  CPC . *H02J 4/00* (2013.01); *G03G 15/80* (2013.01); *H02J 9/005* (2013.01)

(58) Field of Classification Search
  USPC .......................................................... 307/140
  See application file for complete search history.

(56) References Cited

U.S. PATENT DOCUMENTS

2006/0159482 A1    7/2006    Okada

FOREIGN PATENT DOCUMENTS

JP        2002-258687        9/2002

*Primary Examiner* — Robert Deberadinis  
(74) *Attorney, Agent, or Firm* — Oblon, McClelland, Maier & Neustadt, L.L.P.

(57) ABSTRACT

A power source device includes: a first voltage generating unit that includes a power storage unit storing power based on power supplied from a power source and generates a voltage to be supplied to a first load based on the power supplied from the power source; and a second voltage generating unit that generates a voltage to be supplied to a second load based on the power stored in the power storage unit when the first voltage generating unit is controlled to stop generation.

18 Claims, 11 Drawing Sheets

POWER SOURCE DEVICE, ELECTRONIC DEVICE, IMAGE FORMING APPARATUS, AND POWER SOURCE CONTROL METHOD

CROSS-REFERENCE TO RELATED APPLICATIONS

The present application claims priority to and incorporates by reference the entire contents of Japanese Patent Application No. 2012-011215 filed in Japan on Jan. 23, 2012.

BACKGROUND OF THE INVENTION

1. Field of the Invention

The present invention relates to a power source device, an electronic device, an image forming apparatus, and a power source control method.

2. Description of the Related Art

Recently, for the purpose of power saving, an electronic device such as an image forming apparatus that includes a power saving mode (also known as a sleep mode) to reduce the power consumption in a stand-by state, has been widely known.

Specifically, this kind of an electronic device has a power source device that includes a first voltage generating unit (a 24 V generating unit) to supply a first voltage of 24 V, for example, to a load of a drive system such as a motor based on the power supplied from a power source (utility power) and a second voltage generating unit (a 5 V generating unit) to supply a second voltage of 5 V, for example, to a load of a control system such as a control unit based on the power supplied from the power source. In the electronic device, during normal operation when not in the power saving mode, voltage is supplied to the load in the drive system by the first voltage generating unit and to the load in the control system by the second voltage generating unit. When shift to the power saving mode takes place, the power supplied from the power source to the first voltage generating unit is shut off to stop the action of the load in the drive system, thereby enabling only the load in the control system to operate by the voltage supplied from the second voltage generating unit.

In this kind of an electronic device, if the voltage supplied to the load in the drive system and the load in the control system is reduced due to an unexpected instantaneous power interruption (for at least 10 ms), trouble in an image forming operation may occur. For that reason, the electronic device includes, in each of the first voltage generating unit and the second voltage generating unit in the direct current (DC) power source device, an electrolytic capacitor (power storage unit) to store electrical charge (power) based on the power supplied from the power source, whereby stable voltage is supplied to the loads using the electrical charge stored in the electrolytic capacitors if an instantaneous power interruption occurs.

However, in this kind of an electronic device, when the voltages supplied to the first voltage generating unit (24 VDC) and the second voltage generating unit (5 VDC) are shut off, for example, by turning off a power switch (SW), the voltage (5 V) supplied to the load in the control system is reduced earlier than the voltage (24 V) supplied to the load in the drive system because more electrical charge has been stored to the electrolytic capacitor of the first voltage generating unit than the electrolytic capacitor of the second voltage generating unit. As a result, a problem such as an erroneous operation may occur.

In the related art, a technology that can solve the problem described above has been known in which an electric discharge circuit is provided at the load in the drive system to accelerate discharging of the voltage supplied to the load in the drive system; the voltage supplied to the load in the drive system is reduced to the level equal to or less than a predetermined voltage to prevent occurrence of erroneous operation, using the electric discharge circuit; and If the voltage has been lowered to the level equal to or less than the predetermined voltage, discharging using the electric discharge circuit is stopped (refer to Japanese Patent Application Laid-open No. 2002-258687, for example).

However, in the technology disclosed in Japanese Patent Application Laid-open No. 2002-258687, a configuration in which the power remaining in the storage unit such as the electrolytic capacitor is wasted using the electric discharge circuit is employed. There is a problem from the viewpoint of saving resources and energy.

There is a need to provide a power source device, an electronic device, an image forming apparatus, and a power source control method capable of achieving resource saving and energy saving by effectively utilizing the power remaining in a storage unit rather than wasting the power.

SUMMARY OF THE INVENTION

It is an object of the present invention to at least partially solve the problems in the conventional technology.

A power source device includes: a first voltage generating unit that includes a power storage unit storing power based on power supplied from a power source and generates a voltage to be supplied to a first load based on the power supplied from the power source; and a second voltage generating unit that generates a voltage to be supplied to a second load based on the power stored in the power storage unit when the first voltage generating unit is controlled to stop generation.

A power source control method is executed by an electronic device. The electronic device includes: a first load and a second load; a first voltage generating unit that comprises a power storage unit storing power based on power supplied from a power source and generates a voltage to be supplied to the first load based on the power supplied from the power source; a second voltage generating unit that generates a voltage to be supplied to the second load based on the power stored in the power storage unit; and a control unit. The power source control method includes: controlling, by the control unit, the second voltage generating unit to generate a voltage to be supplied to the second load based on the power stored in the power storage unit when the first voltage generating unit is controlled to stop generation.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The embodiments of the present invention will now be described with reference to the accompanying drawings.

The power source device, the electronic device, the image forming apparatus, and the power source control method according to the embodiments of the present invention can be applied to various electronic devices such as an image forming apparatus. Examples in which the present invention is applied to the image forming apparatus will be described below.

First Embodiment

Figure 1:
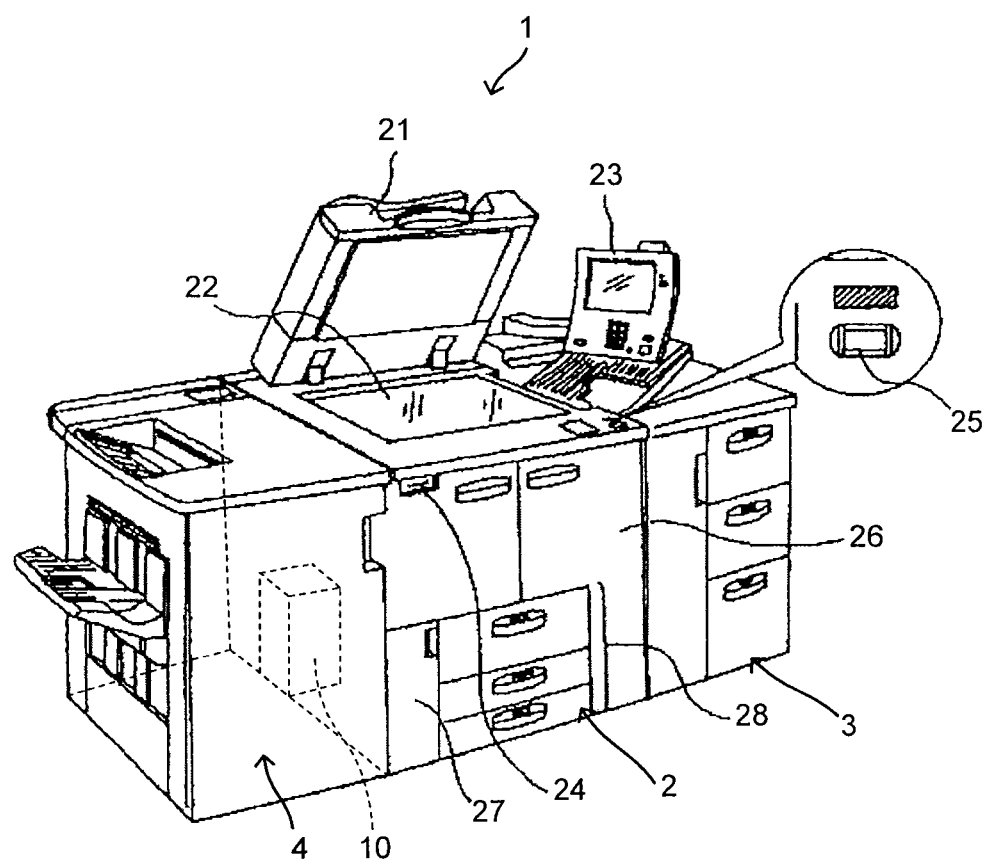
FIG. 1 is a perspective view of the external structure of an image forming apparatus according to an embodiment of the present invention.

First, the external structure of an image forming apparatus 1 according to the first embodiment of the present invention will be described with reference to FIG. 1. FIG. 1 is a perspective view of the external structure of the image forming apparatus 1 according to the present embodiment.

As illustrated in FIG. 1, the image forming apparatus 1 generally includes a main body 2, a large capacity tray (hereinafter, referred to as an "LCT") 3, and a finisher (hereinafter, referred to as a "FIN unit") 4. The main body 2 performs a copying operation. The LCT 3 contains a lot of recording media such as sheets of paper and feeds the recording medium to the main body 2. The FIN unit 4 performs post processing such as sorting, perforating, and stapling on the recording medium on which copying has been performed in the main body 2.

The main body 2 includes an automatic document feeder (hereinafter, referred to as an "ADF") 21 arranged at the upper part of the main body. The ADF 21 can be opened and closed and a document can be set on it. The main body 2 also includes an exposure glass (also referred to as a document glass plate) 22 also on which a document can be set.

That is to say, in the image forming apparatus 1, the document set on the ADF 21 can be passed through the scanning position of a scanner unit not illustrated (also referred to as an image reading device) by the ADF 21 to read an image on the document. In addition, the image on the document set on the document glass plate 22 can be read by the image reading device not illustrated.

The main body 2 also includes at the upper part thereof an operating unit 23 having a display panel that displays an icon representing a key to select various functions, various information, such as an operation state and a message, and a key (button) to perform various operations such as specifying the number of copies or a method of reading the document.

The main body 2 includes at the front upper part thereof a main power switch 24 for turning on or off the main power of the image forming apparatus 1.

That is to say, in the image forming apparatus 1, when a user turns on the main power switch 24, power is supplied from utility power (an alternating current (AC) power source) 5 (refer to FIG. 2) so that the image forming apparatus 1 is started. After that, while in operation, when the user turns off the main power switch 24, the power supply from the utility power 5 is shut off so that the operation of the image forming apparatus 1 is stopped.

The main body 2 includes at the upper part thereof a sub-power key (hereinafter, referred to as a "power saving button") 25 to shift the operation mode of the image forming apparatus 1 to the power saving mode (also referred to as a sleep mode).

That is to say, in the image forming apparatus 1, if a control unit 71 (refer to FIG. 2), which will be described later, detects that the power saving button 25 is pressed down by the user in a normal operation mode as a first operation mode in which the power is supplied to both a load 6 in the drive system as a first load and a load 7 in the control system as a second load (refer to FIG. 2), which will be described later, shift to the power saving mode as a second operation mode takes place to achieve reduction of the power consumption (to make the power consumption low) in a stand-by state of the image forming apparatus 1 (a shift method 1).

Also in the image forming apparatus 1, if the control unit 71 detects no operation by the user such as an operation on the operating unit 23 and opening/closing the ADF 21 for a predetermined time in the normal operation mode; or if the control unit 71 detects no reception of any job such as a print job through a communication network (not illustrated) for a predetermined time in the normal operation mode, shift to the power saving mode takes place (a shift method 2).

Furthermore, in the image forming apparatus 1, after shift to the power saving mode by the shift method 1 or the shift method 2 takes place, if the control unit 71 detects any operation by the user on, for example, the power saving button 25, the operating unit 23, or the ADF 21; or if the control unit 71 detects reception of any job, the power saving mode is cancelled and the image forming apparatus 1 is shifted to the normal operation mode.

The main body 2 includes at the front thereof a front cover 26 or a toner cover 27 that can be opened and closed for the purpose of solving a paper jam, replacing a unit, or the like.

The main body 2 also includes a paper cassette 28 that contains therein recording media such as sheets of paper. That is to say, in the image forming apparatus 1, image forming (copying) can be performed on the recording media such as the sheets of paper contained in the LCT unit 3 or the paper cassette 28.

Furthermore, the image forming apparatus 1 according to the present embodiment includes a direct current (DC) power source device 10 that supplies power (DC voltage) to the loads such as the load 6 in the drive system as a first load and the load 7 in the control system as a second load (refer to FIG. 2 for both), inside the main body 2, for example.

Figure 2:
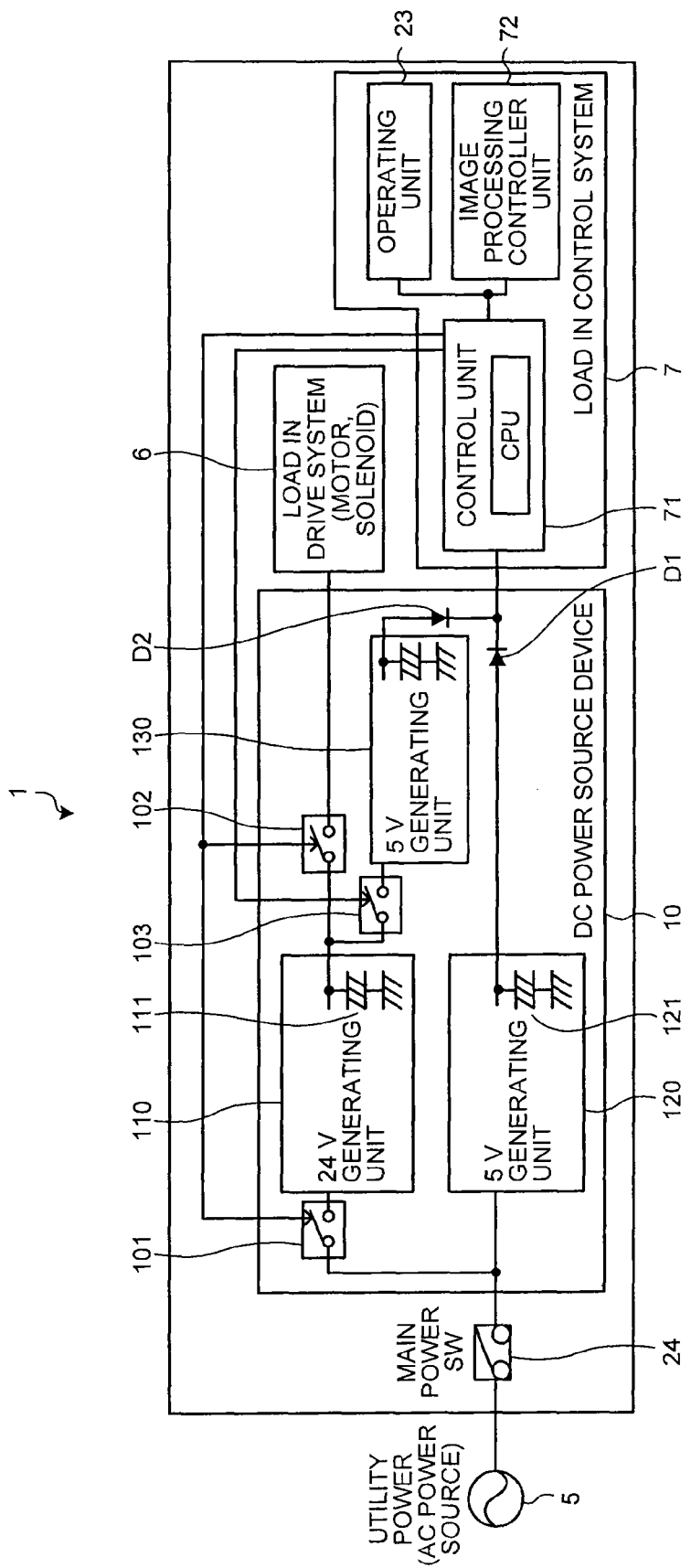
FIG. 2 is a block diagram of the structure of a direct current (DC) power source device.
Figure 3:
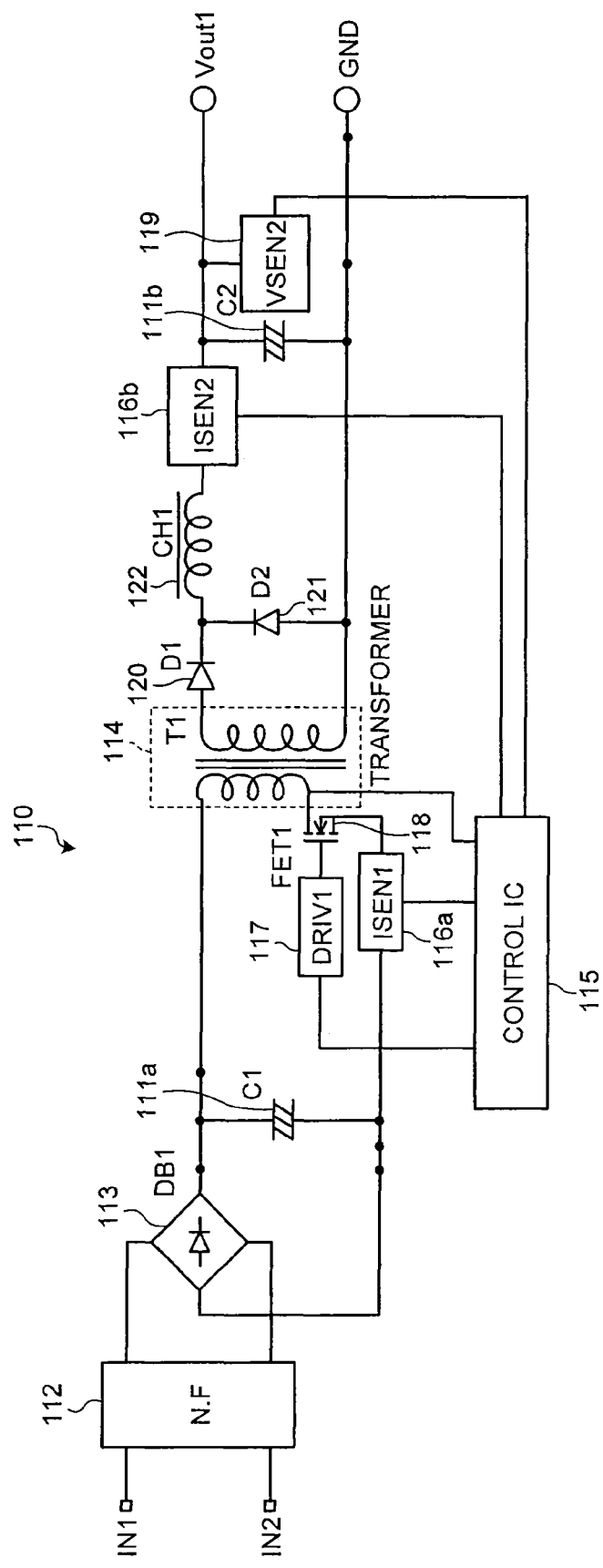
FIG. 3 is a circuit diagram of an example of the structure of a 24 V generating unit illustrated in FIG. 2.

The structure of the DC power source device 10 will now be described with reference to FIGS. 2 and 3. FIG. 2 is a block diagram of the structure of the DC power source device 10, and FIG. 3 is a circuit diagram of an example of the structure of a 24 V generating unit 110.

When the main power switch (SW) 24 is turned on (switch closed) and the power (AC power) is supplied from the utility power 5, the DC power source device 10 illustrated in FIG. 2 generates a predetermined DC voltage (an output voltage) and outputs the generated output voltage to the loads of the image forming apparatus 1 such as the load 6 in the drive system and the load 7 in the control system.

As illustrated in FIG. 2, the DC power source device 10 according to the present embodiment includes the 24 V generating unit (a first voltage generating unit) 110, a 5 V generating unit (a third voltage generating unit) 120, a 5 V generating unit (a second voltage generating unit) 130, a switch (a third switching unit) 101, a switch (a first switching unit) 102, a switch (a second switching unit) 103, a diode D1 and a diode D2.

The 24 V generating unit 110 generates the 24 V DC voltage (the output voltage) to be supplied to the load 6 in the drive system such as a motor and a solenoid provided in a developing unit (not illustrated) that copies an image that has been read, onto a recording medium such as a sheet of paper based on the power supplied from the utility power 5.

The 5 V generating unit 120 generates the 5 V DC voltage (the output voltage) to be supplied to the load 7 in the control system such as the control unit 71 and the operating unit 23 and an image processing controller unit 72 connected to the control unit 71. The control unit 71 controls an operation relating to image formation of the load 6 in the drive system and integrally controls the image forming apparatus 1 based on the power supplied from the utility power 5. The image processing controller unit 72 controls the image processing.

An electrolytic capacitor 111 is provided in the 24 V generating unit 110 and an electrolytic capacitor 121 is provided in the 5 V generating unit 120 so that the DC voltage (the output voltage) can be supplied stably to the load 6 in the drive system and the load 7 in the control system if an unexpected instantaneous power interruption for at least 10 ms occurs. The electrolytic capacitor 111 and the electrolytic capacitor 121 serve as power storage units that store an electrical charge (also referred to as electrical power or electrical energy) based on the power supplied from the utility power 5. The electrolytic capacitor 111 can store more electrical charge than the electrolytic capacitor 121.

The 5 V generating unit 130 generates approximately 5 V (e.g. 5.1 V) DC voltage (the output voltage) to be supplied to the load 7 in the control system based on a remaining electrical charge (power) stored in the electrolytic capacitor 111 of the 24 V generating unit 110 in the power saving mode.

In the DC power source device 10 illustrated in FIG. 2, the output from the 5 V generating unit 120 and the output from the 5 V generating unit 130 are joined together using the diode D1 and the diode D2 so that the 5 V output voltage is supplied to the load 7 in the control system. More specifically, in the DC power source device 10 illustrated in FIG. 2, although the 5 V generating unit 120 and the 5 V generating unit 130 generate and output the 5 V output voltages, the output voltage by the 5 V generating unit 130 is set to be slightly higher than the output voltage by the 5 V generating unit 120. For example, the output voltage value by the 5 V generating unit 120 is set to 5.0V and the output voltage value by the 5 V generating unit 130 is set to 5.1 V.

The reason why the output voltage by the 5 V generating unit 130 is set to be slightly higher than the output voltage by the 5 V generating unit 120 is to supply the output voltage by the 5 V generating unit 130 to the load 7 in the control system more preferentially than the output voltage by the 5 V generating unit 120 in the structure in which the output from the 5 V generating unit 120 and the output from the 5 V generating unit 130 are joined together using the diode D1 and the diode D2 (refer to FIG. 2), that is to say, to effectively use the remaining electrical charge (power) stored in the electrolytic capacitor 111 of the 24 V generating unit 110 in the power saving mode. It has been verified through an experiment that the output voltage by the 5 V generating unit 130 is supplied to the load 7 in the control system in preference to the output voltage by the 5 V generating unit 120.

As described above, although the 5 V generating unit 130 is configured to output a slightly higher voltage than the output voltage by the 5 V generating unit 120, actually, the 5 V generating unit 130 may be configured to output the voltage not higher than a maximum voltage value under which the load 7 in the control system (e.g. the CPU of the control unit 71) does not fail.

The structure of the 24 V generating unit 110 illustrated in FIG. 2 will now be described in detail with reference to FIG. 3.

As illustrated in FIG. 3, the 24 V generating unit 110 includes a noise filter (N.F) 112, a diode bridge (DB1) 113, an electrolytic capacitor (C1) 111a in a primary side and an electrolytic capacitor (C2) 111b in a secondary side as the electrolytic capacitor 111 illustrated in FIG. 2, a transformer (T1) 114, a control integrated circuit (IC) 115, an over-current detection circuit (ISEN1) 116a and an over-current detection circuit (ISEN2) 116b, a drive circuit (DRIV1) 117, an electrolysis effect transistor (FET1) 118, an over-voltage detection circuit (VSEN2) 119, a rectifier diode (D1) 120, a commutation diode (D2) 121, and a choke coil (CH1) 122.

The electrolytic capacitor 111a and the electrolytic capacitor 111b are to smooth the voltage to be output. On the electrolytic capacitor 111a and the electrolytic capacitor 111b, more electrical charge (power) is stored than the electrolytic capacitor 121 of the 5 V generating unit 120.

The noise filter 112 is to filter the AC power source that is input from the utility power 5 through an input terminal (IN1) and an input terminal (IN2) coupled to a switch 101. The 5 V generating unit 120 includes an x capacitor, a Y capacitor, a common mode coil, or a discharging resistor, for example.

The diode bridge 113 is to full-wave rectify the AC voltage that has been filtered by the noise filter 112.

When a voltage is applied through the electrolytic capacitor 111a, the transformer 114 generates a voltage (power source) to be supplied to the control IC 115 and outputs the generated voltage to the control IC 115.

When the voltage (power source) is supplied through the transformer (T1) 114, the control IC 115 is started and performs switching of the electrolysis effect transistor 118 through the drive circuit 117. The period of the switching is generally approximately 100 kHz. The control IC 115 turns on and off the electrolysis effect transistor 118 in the period of 100 kHz so that the feedback voltage from the over-voltage detection circuit 119 becomes constant. If the over-current detection circuit 116a or the over-current detection circuit 116b detects an over-current, the control IC 115 reduces the on-duty width of the electrolysis effect transistor 118 or stops the on-control of the electrolysis effect transistor 118.

In the 24 V generating unit 110, a secondary winding of the transformer 114 is coupled to an output terminal (Vout1) through a forward type converter including the rectifier diode 120, the commutation diode 121, the choke coil 122, and the electrolytic capacitor 111b. The output terminal (Vout1) is coupled to the load 6 in the drive system.

In the present embodiment, as a method of stopping the output voltage generation by the 24 V generating unit 110, a method is adopted in which the switch 101 provided in the input side of the 24 V generating unit 110 is turned off based on the control of the control unit 71. However, the embodiment is not limited to this method. A method of stopping the output voltage generation by the 24 V generating unit 110 by inputting a stop signal to the control IC 115 based on the control of the control unit 71 to stop the on and off control of the electrolysis effect transistor 118 can be adopted.

Figure 4:
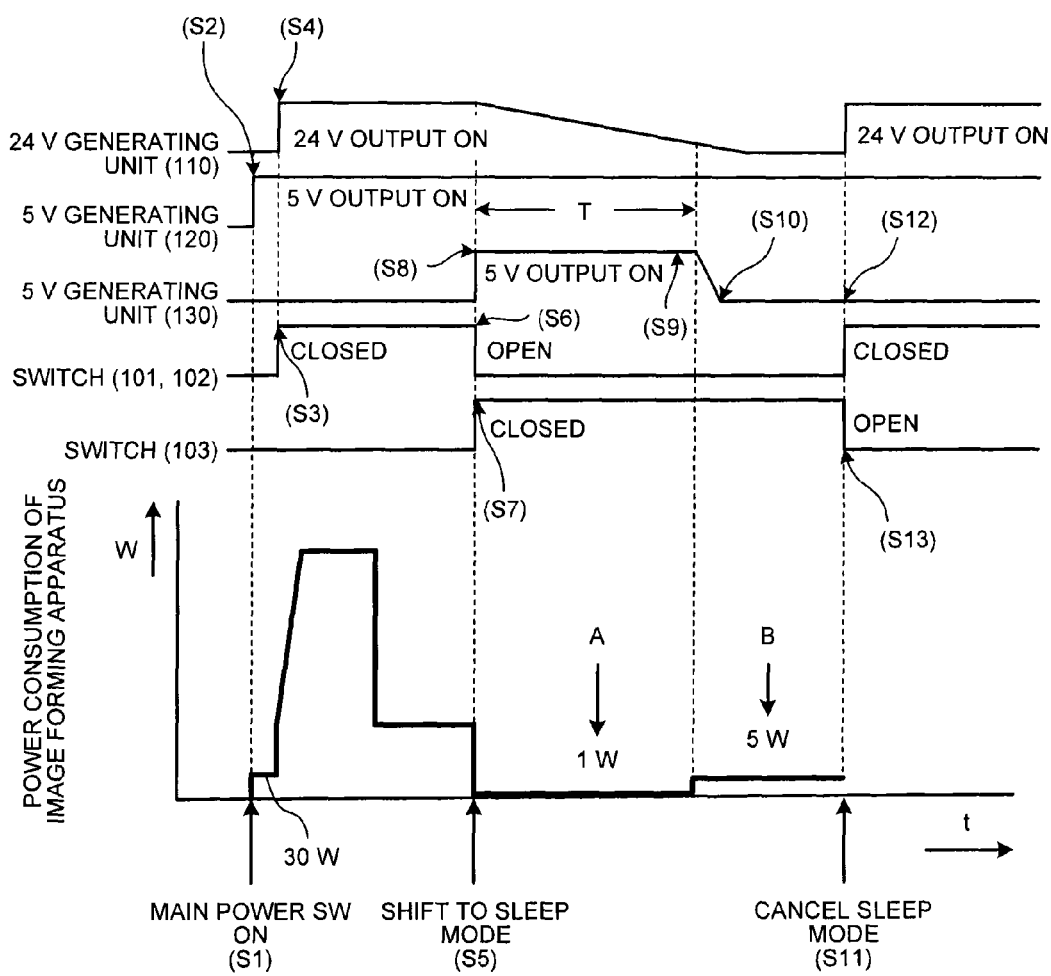
FIG. 4 is a timing chart for explaining the power consumption in various operation states of the image forming apparatus according to the embodiment.

Power supply operation of the image forming apparatus 1 including the DC power source device 10 illustrated in FIG. 2 in the normal operation mode and the power saving mode will now be described with reference to FIG. 4. FIG. 4 is a timing chart for explaining the power consumption in various operation states of the image forming apparatus 1 (especially in the power consumption in the power saving mode).

First, the power supply operation of the image forming apparatus 1 in the normal operation mode will be described.

In the image forming apparatus 1, when the main power switch 24 is turned on by the user (S1), the power is supplied from the utility power 5 to the 5 V generating unit 120. Then, the 5 V generating unit 120 generates the 5 V output voltage and supplies the output voltage to the control unit 71 (S2). Then, the central processing unit (CPU) of the control unit 71 is started and turns on both the switch 101 and the switch 102 (switch closed) (S3). As a result, the power is supplied from the utility power 5 to the 24 V generating unit 110, then the 24 V generating unit 110 generates the 24 V output voltage and supplies the output voltage to the load 6 in the drive system (S4), whereby the control unit 71 can activate the load 6 in the drive system. That is to say, in the image forming apparatus 1, when shift to the normal operation mode takes place and the temperature of a fixing unit included in the load 6 in the drive system increases to a predetermined level, an image forming (copying) operation becomes possible.

The power supply operation of the image forming apparatus 1 in the power saving mode will now be described.

In the image forming apparatus 1, when shift to the power saving mode from the normal operation mode takes place using the shift method 1 or shift method 2 for the power saving mode (sleep mode) (S5), the CPU of the control unit 71 is activated by the 5 V output voltage supplied from the 5 V generating unit 120 to turn off both the switch 101 and the switch 102 (switch open) (i.e. the 24 V generating unit 110 is controlled to stop the voltage generation) (S6), and turn on the switch 103 (switch closed) (S7). As a result, in the image forming apparatus 1, the power is no longer supplied from the utility power 5 to the 24 V generating unit 110, thus the 24 V generating unit 110 stops generating the voltage, whereby the load 6 in the drive system stops its operation. In this state, in the image forming apparatus 1, the remaining electrical charge (power) is stored in the electrolytic capacitor 111 (111a and 111b) of the 24 V generating unit 110, thus the remaining electrical charge (power) stored in the electrolytic capacitor 111 is supplied to the 5 V generating unit 130. Then, the 5 V generating unit 130 generates and outputs 5.1 V output voltage (S8).

After that, in the image forming apparatus 1, until the value of the output voltage by the 5 V generating unit 130 is reduced from "5.1 V" to become the same value as the output voltage by the 5 V generating unit 120, "5.0 V" (time T), the output voltage by the 5 V generating unit 130 is supplied to the load 7 in the control system (S9) in preference to the output voltage by the 5 V generating unit 120. When the value of the output voltage by the 5 V generating unit 130 becomes the same as the value of the output voltage by the 5 V generating unit 120, the 5 V output voltage is supplied from both the 5 V generating unit 120 and the 5 V generating unit 130 to the load 7 in the control system. When the value of the output voltage by the 5 V generating unit 130 becomes lower than the value of the output voltage by the 5 V generating unit 120 (S10), subsequently in the power saving mode, the output voltage by the 5 V generating unit 120 is supplied to the load 7 in the control system.

In the image forming apparatus 1, when the image forming apparatus 1 is operated by the user or receives a job during the power saving mode, the power saving mode (sleep mode) is cancelled (S11). When the CPU of the control unit 71 detects that the power saving mode is cancelled, the CPU of the control unit 71 turns on the switch 101 and the switch 102 (switch closed) (S12) like as when the main power switch 24 is turned on, and turns off the switch 103 (switch open) (S13). Subsequently in the image forming apparatus 1, processing operation in the normal operation mode is performed.

That is to say, in the image forming apparatus 1 according to the present embodiment, when shift to the power saving mode takes place, and while the 5.1 V output voltage is output from the 5 V generating unit 130, the power consumption of the image forming apparatus 1 is only, for example, the power consumption "1 W" (refer to the sign A in FIG. 4) to activate the 5 V generating unit 130. Then, when the remaining electrical charge (power) stored in the electrolytic capacitor 111 of the 24 V generating unit 110 is effectively used (used up) and thus the output voltage supplied from the 5 V generating unit 130 is discontinued, the power consumption of the image forming apparatus 1 becomes, for example, the power consumption "5 W" (refer to the sign B in FIG. 4) obtained by adding the power consumption to activate the control unit 71 and the switches to the power consumption "1 W" of the 5 V generating unit 130.

Figure 11:
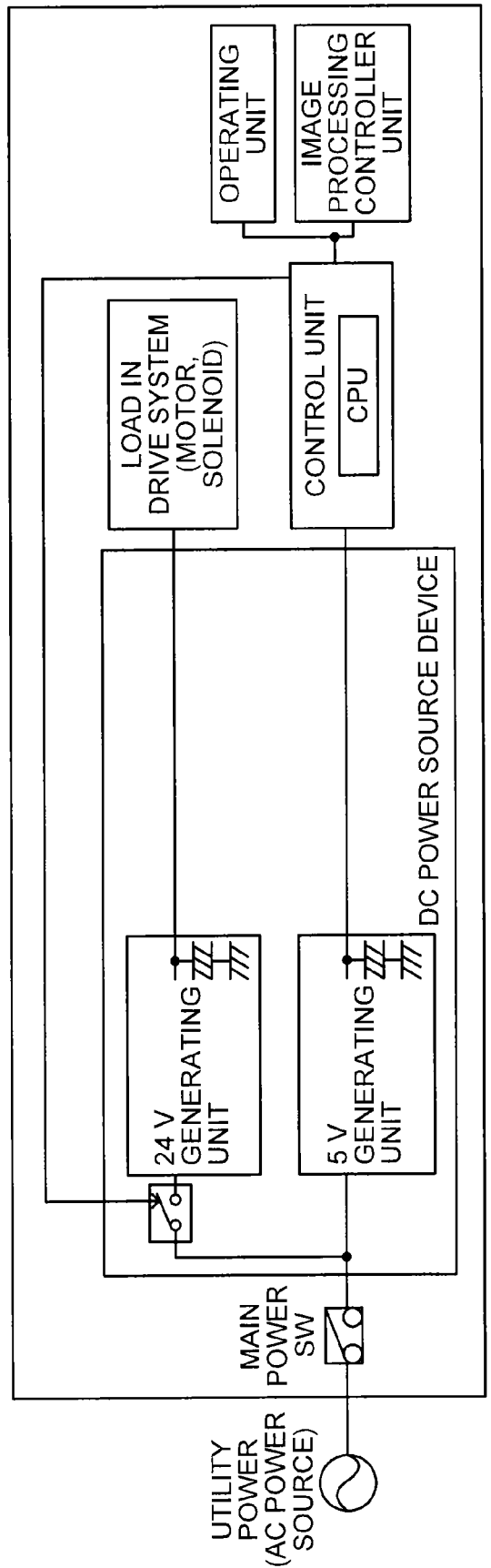
FIG. 11 is a block diagram for explaining the structure and processing operation of the image forming apparatus in the related art.

According to the embodiment described above, when shift to the power saving mode takes place, the remaining electrical charge (power) stored in the electrolytic capacitor 111 (111a and 111b) of the 24 V generating unit 110 can be effectively utilized rather than being wasted. Therefore, resource saving and energy saving can be achieved more effectively than the image forming apparatus in the related art (refer to FIG. 11).

Other embodiments different from the embodiment above will now be described with reference to FIGS. 5 to 10.

Second Embodiment

Figure 5:
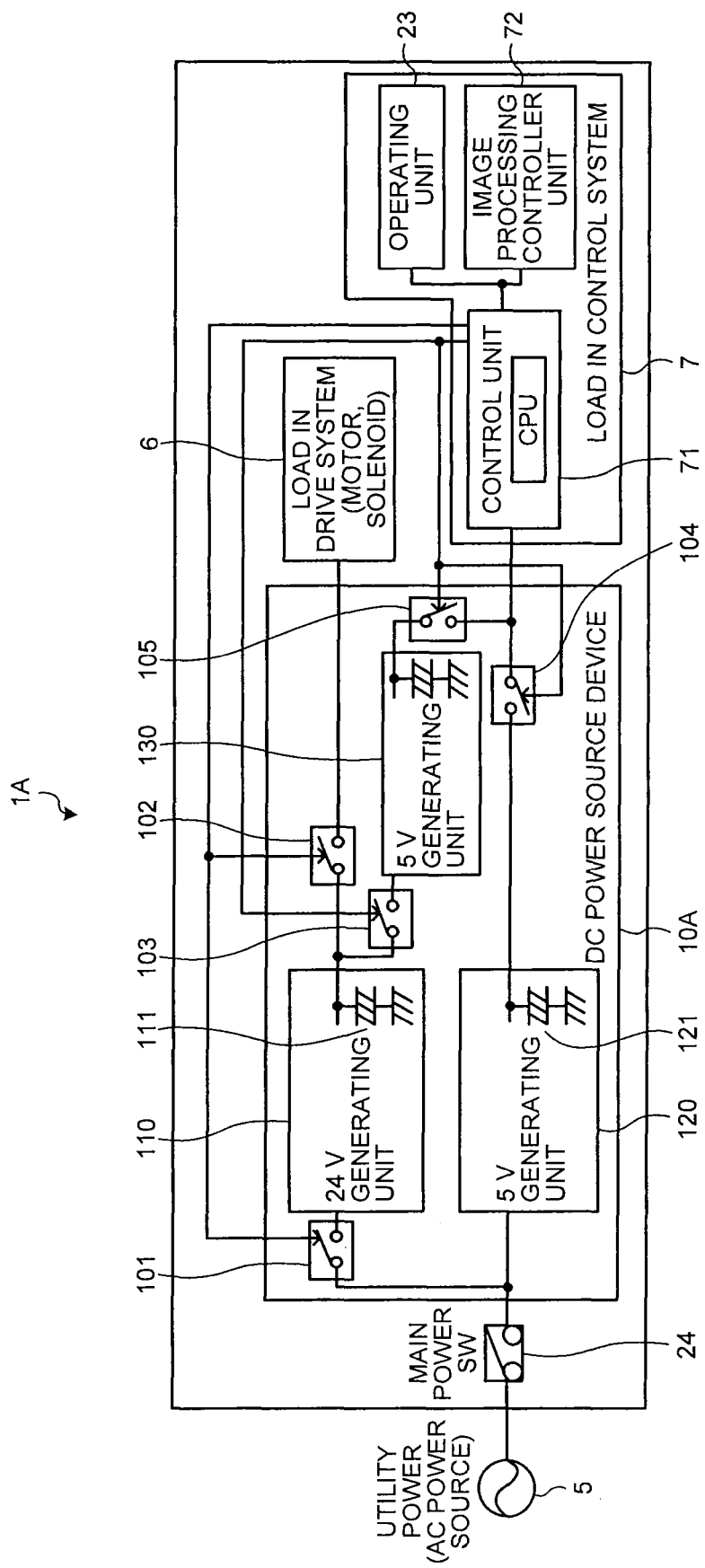
FIG. 5 is a block diagram for explaining the structure and processing operation of the image forming apparatus according to another embodiment of the present invention.

First, the structure and processing operation of an image forming apparatus 1A including a DC power source device 10A according to the second embodiment, which is modified from the DC power source device 10 illustrated in FIG. 2, will be described with reference to FIG. 5. FIG. 5 is a block diagram of the structure of the DC power source device 10A, which is modified from the DC power source device 10 illustrated in FIG. 2.

As illustrated in FIG. 5, the difference in the DC power source device 10A from the DC power source device 10 illustrated in FIG. 2 is that the DC power source device 10A includes a switch (a fourth switching unit) 104 and a switch (a fifth switching unit) 105 (a relay, a transistor, or a semiconductor such as an FET) instead of the diode D1 and the diode D2. The structure is the same as the DC power source device 10 except for the difference above, and the description of the same structure is omitted.

In the image forming apparatus 1A including the DC power source device 10A, when shift from the normal operation mode to the power saving mode (sleep mode) takes place, the control unit 71 turns the switch 101 and the switch 102, from on to off and turns the switch 103 from off to on to control the 24 V generating unit 110 to stop the voltage generation, then the control unit 71 turns the switch 104 from on to off and turns the switch 105 from off to on. If a predetermined time has elapsed since the switch 105 is turned on, the control unit 71 turns off the switch 105 and turns on the switch 104.

According to the second embodiment, the advantageous effect as described above can be achieved. That is to say, when shift to the power saving mode takes place, the remaining electrical charge (power) stored in the electrolytic capacitor 111 of the 24 V generating unit 110 can be effectively utilized rather than wasted, whereby it is possible to provide advantageous effect of achieving resource saving and energy saving.

Third Embodiment

Figure 6:
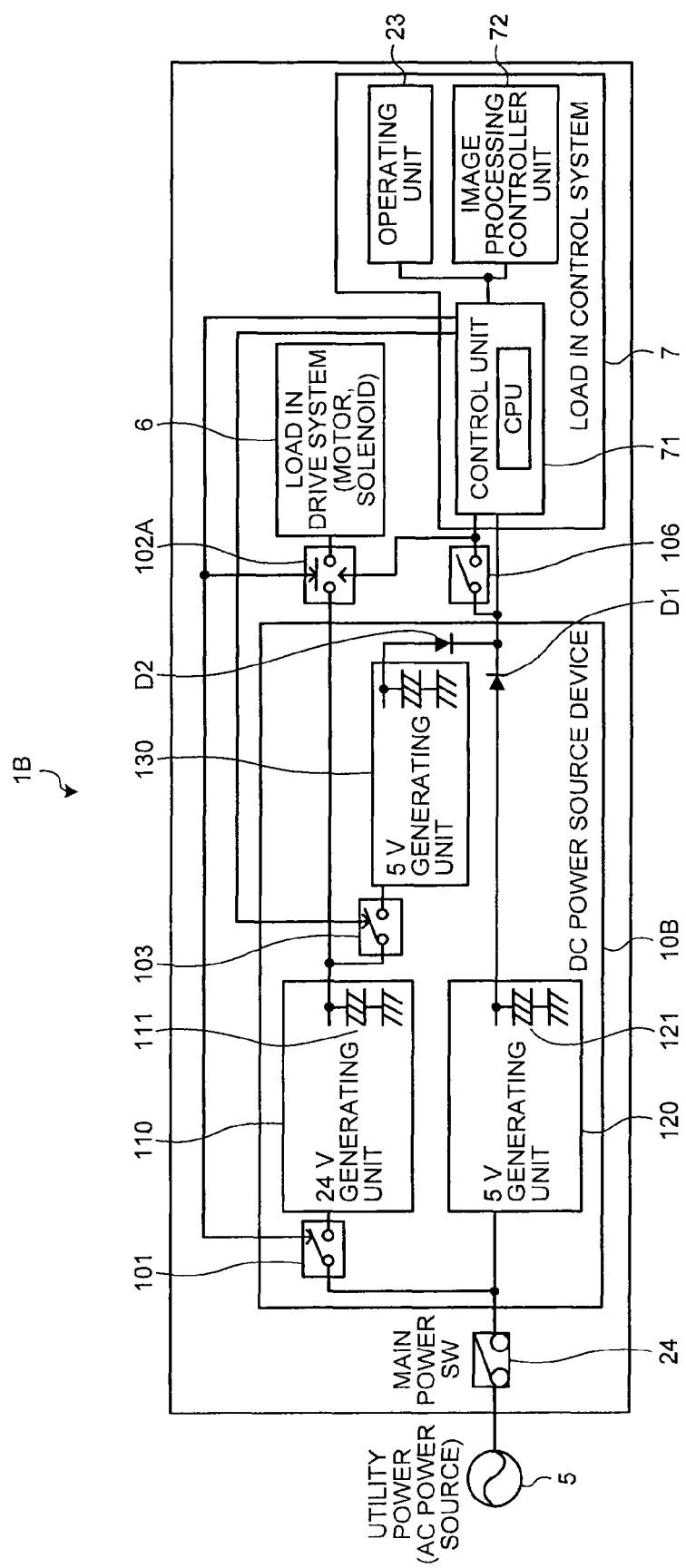
FIG. 6 is a block diagram for explaining the structure and processing operation of the image forming apparatus according to another embodiment.

The structure and processing operation of an image forming apparatus 1B including a DC power source device 10B according to the third embodiment, which is modified from the DC power source device 10 illustrated in FIG. 2, will now be described with reference to FIGS. 6 and 7. FIG. 6 is a block diagram of the structure of the DC power source device 10B, which is modified from the DC power source device 10 illustrated in FIG. 2, and FIG. 7 is a timing chart for explaining the power consumption in various operation states of the image forming apparatus 1B including the DC power source device 10B illustrated in FIG. 6.

As illustrated in FIG. 6, the difference in the DC power source device 10B from the DC power source device 10 illustrated in FIG. 2 is that the switch 102 is provided outside the DC power source device 10B (as a switch 102A). The structure is the same as the DC power source device 10 except for the difference above, and the description of the same structure is omitted. In the image forming apparatus 1 including the DC power source device 10B, the switch 102A and a cover-open detection switch (SW) 106 are provided additionally.

In the image forming apparatus 1B including the DC power source device 10B, the cover-open detection switch (SW) 106 and the switch 102A are provided. More specifically, the cover-open detection switch 106 detects opening/closing of various covers such as the front cover 26 and the toner cover 27 (refer to FIG. 1 for both). The switch 102A is turned on in the normal operation mode and turned off when shift to the power saving mode takes place, under the control of the control unit 71 in the same manner as the switch 102 illustrated in FIG. 2 and the switch 102A is turned on or off in accordance with the on or off of the cover-open detection switch 106. In other words, the switch 102A includes a function to shut off the power to the moving part and the heat generating part (i.e. the load 6 in the drive system) that may cause injury to a user's hand, body or the like when various covers are opens.

Figure 7:
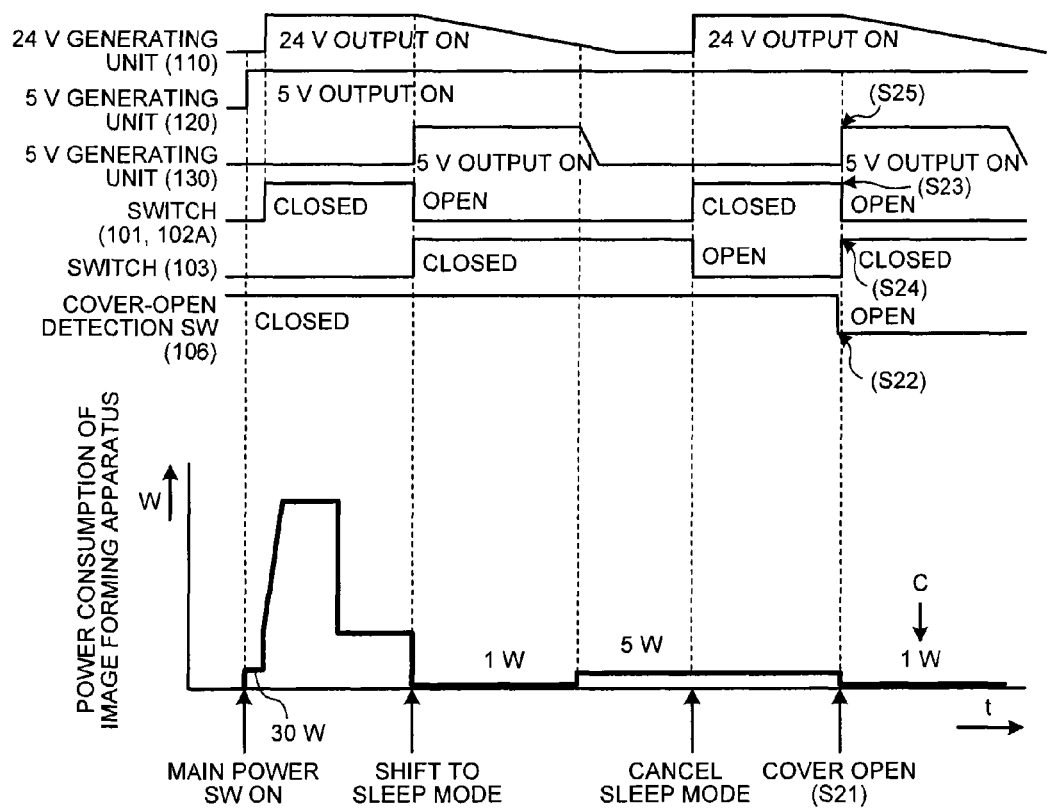
FIG. 7 is a timing chart for explaining the structure and processing operation of the image forming apparatus according to another embodiment.

That is to say, in the image forming apparatus 1B including the DC power source device 10B, as illustrated in FIG. 7, when a cover is opened, the control unit 71 detects the opening of the cover through the cover-open detection switch 106. As a result, the control unit 71 turns off the switch 101 (switch open) and turns on the switch 103 (switch closed). At the same time, the switch 102A is turned off in a hardware manner (switch open) based on the information that the cover is open from the cover-open detection switch 106 (S21 to S25).

An example of a method of turning off in a hardware manner is that a normal open relay is adopted for the switch 102A and a voltage of the cover-open detection switch 106 is applied to a coil unit (not illustrated) of the relay. That is to say, when the cover is opened (S21) and the cover-open detection switch 106 becomes open (S22), the voltage is no longer applied to the coil unit, thus the relay is turned off (switch open) (S23). On the other hand, when the cover is closed and the cover-open detection switch 106 becomes closed, the voltage is applied to the coil unit, whereby the relay is turned on (switch closed).

Therefore, according to the third embodiment, in conjunction with the opening/closing of the cover, the switch (102A) to turn on or off the path to supply the power from the 24 V generating unit 110 to the load 6 in the drive system can be on-off controlled. Accordingly, when the cover is opened and the cover-open detection switch 106 is turned off (switch open), the remaining electrical charge (power) stored in the electrolytic capacitor 111 of the 24 V generating unit 110 can be effectively utilized rather than wasted, whereby it is possible to provide advantageous effect of achieving resource saving and energy saving. Specifically, in an example illustrated in FIG. 7, when the cover is opened and the cover-open detection switch 106 is turned off (switch open), the power consumption of the image forming apparatus 1 of only 1 W is required (refer to the sign C in FIG. 7).

In FIG. 6, the switch 102A and the cover-open detection switch 106 are provided outside the DC power source device 10B, however, the embodiment is not limited to this. At least either one of the switch 102A and the switch 106 may be included in the DC power source device 10B.

Fourth Embodiment

Figure 8:
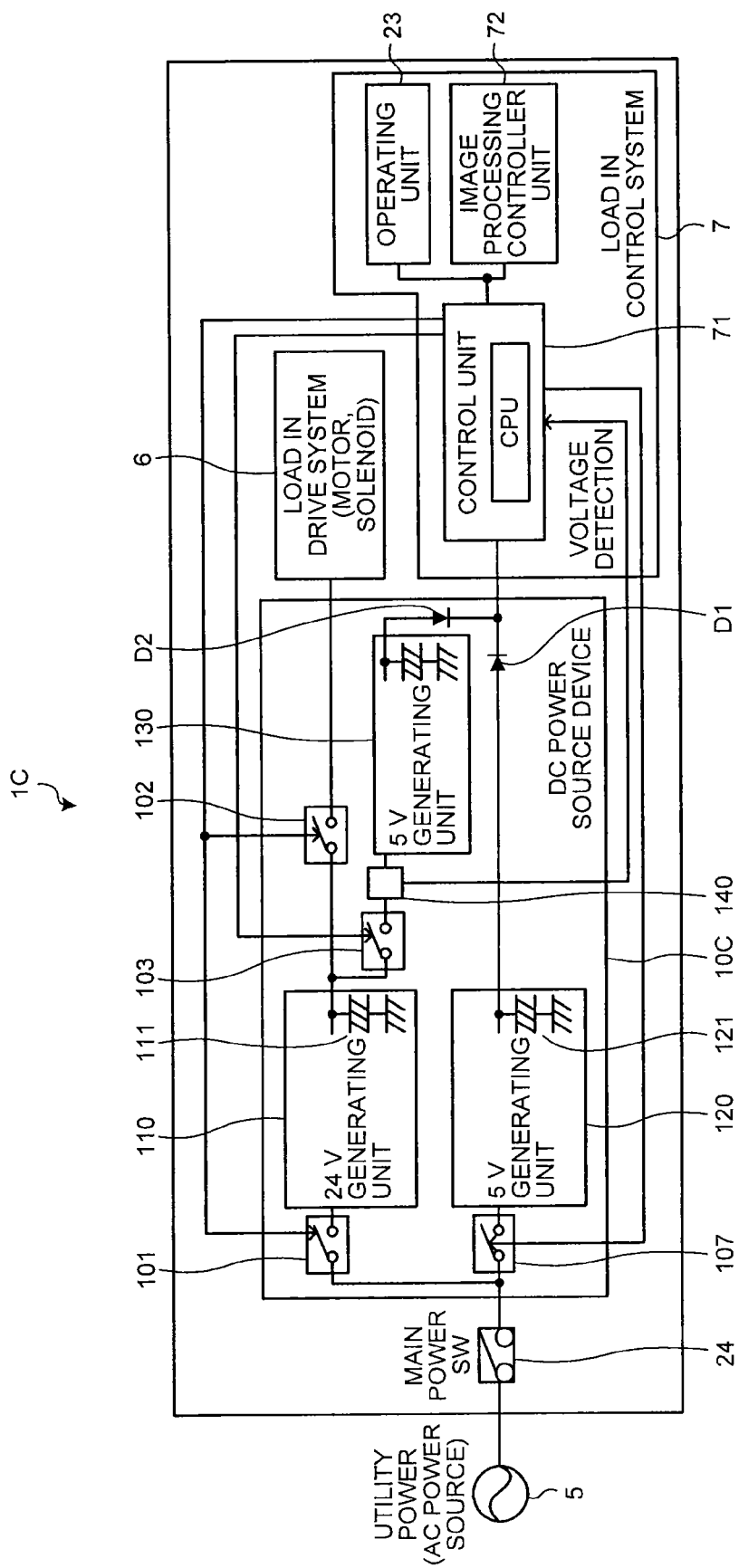
FIG. 8 is a block diagram for explaining the structure and processing operation of the image forming apparatus according to another embodiment.

The structure and processing operation of an image forming apparatus 1C including a DC power source device 10C according to the fourth embodiment, which is modified from the DC power source device 10 illustrated in FIG. 2, will now be described with reference to FIGS. 8 and 9. FIG. 8 is a block diagram of the structure of the DC power source device 10C, which is modified from the DC power source device 10 illustrated in FIG. 2, and FIG. 9 is a timing chart for explaining the power consumption in various operation states of the image forming apparatus 1C including the DC power source device 100 illustrated in FIG. 8.

As illustrated in FIG. 8, the difference in the DC power source device 100 from the DC power source device 10 illustrated in FIG. 2 is that a voltage detection circuit (voltage detection unit) 140 and a switch (a sixth switching unit) 107 are additionally provided. The structure is the same as the DC power source device 10 except for the difference above, and the description of the same structure is omitted.

The voltage detection circuit 140 is to detect the value of the voltage (voltage value) supplied to the 5 V generating unit 130, and the switch 107 is to turn on or off the path to supply the power from the utility power 5 to the 5 V generating unit 120.

Figure 9:
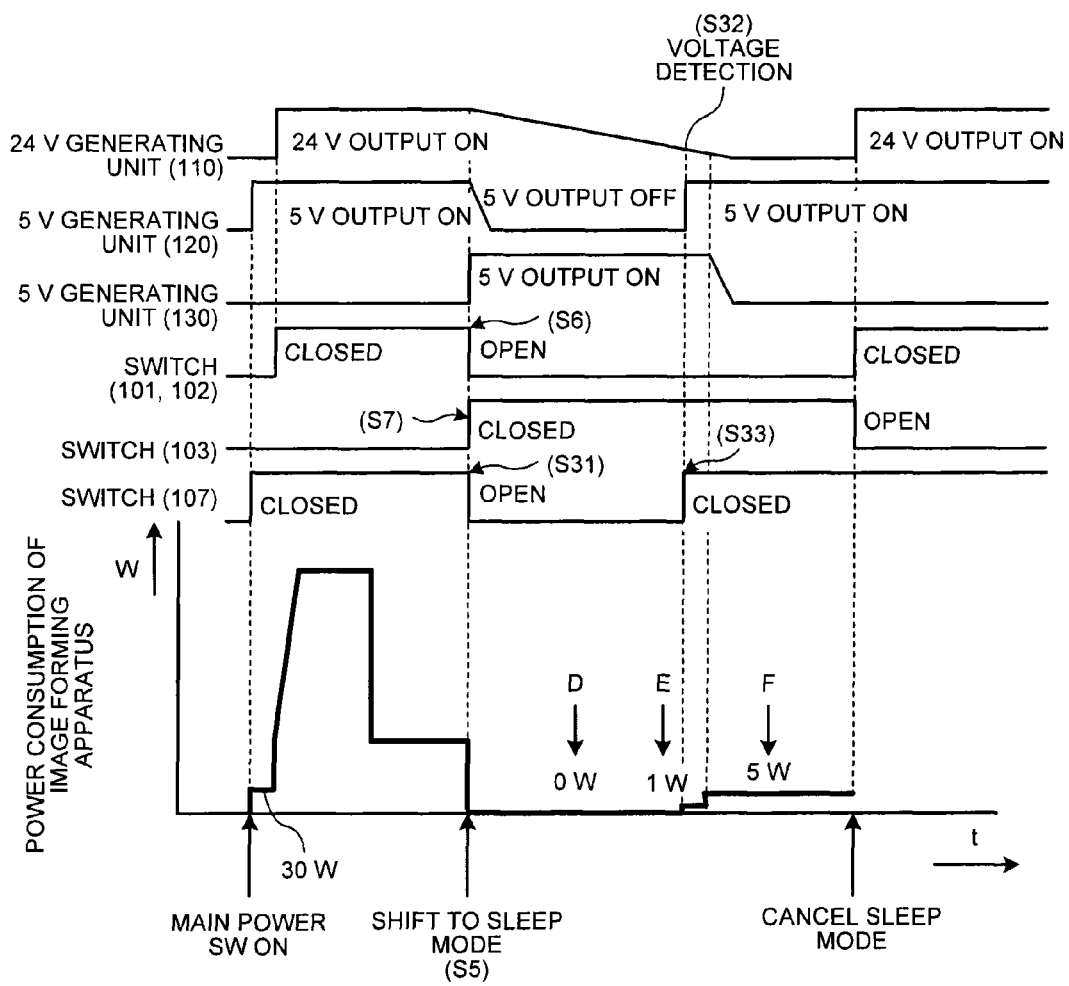
FIG. 9 is a timing chart for explaining the structure and processing operation of the image forming apparatus according to another embodiment.

As illustrated in FIG. 9, in the DC power source device 10C, when shift to the power saving mode (sleep mode) takes place (S5), and the switch 101 and the switch 102 are turned from on (switch closed) to off (switch open) by the control unit 71 (S6) to stop the voltage generation by the 24 V generating unit 110, the switch 103 is turned from off to on (S7) under the control of the control unit 71 in the same manner as the DC power source device 10 illustrated in FIG. 2.

After that, in the DC power source device 10C, the control unit 71 determines whether the voltage value detected by the voltage detection circuit 140 is equal to or more than a predetermined value. If it is determined that the voltage value is equal to or more than the predetermined value, (i.e. necessary power can be fully supplied from the 5 V generating unit 130 to the load 7 in the control system), the switch 107 is turned off by the control unit 71 (S31). When the switch 107 is turned off, the power consumption of the image forming apparatus 1 becomes almost 0 W (refer to the sign D in FIG. 9).

After the switch 107 is turned off, in the DC power source device 10C, when the remaining electrical charge (power) stored in the electrolytic capacitor 111 is reduced and the control unit 71 detects that the voltage value detected the voltage detection circuit 140 is lower than a predetermined value (i.e. the power to be supplied from the 5 V generating unit 130 to the load 7 in the control system is about to run out) (S32), the switch 107 is turned on (switch closed) by the control unit 71 (S33). The power consumption of the image forming apparatus 1 becomes 1 W at that time (the sign E in FIG. 9). When the output voltage from the 5 V generating unit 130 to the load 7 in the control system is reduced to the level less than the voltage supplied by the 5 V generating unit 120, the load 7 in the control system (the control unit 71, in particular) is activated by the voltage supplied by the 5 V generating unit 120, whereby the power consumption of the image forming apparatus 1 is increased to 5 W (the sign F in FIG. 9).

According to the fourth embodiment, when necessary power can be fully supplied from the 5 V generating unit 130 to the load 7 in the control system, the 5 V generating unit 120 is controlled to stop the output voltage generation, and thus the power consumed in the 5 V generating unit 120 can be made to be almost 0 W, whereby further resource saving and energy saving can be achieved.

Fifth Embodiment

Figure 10:
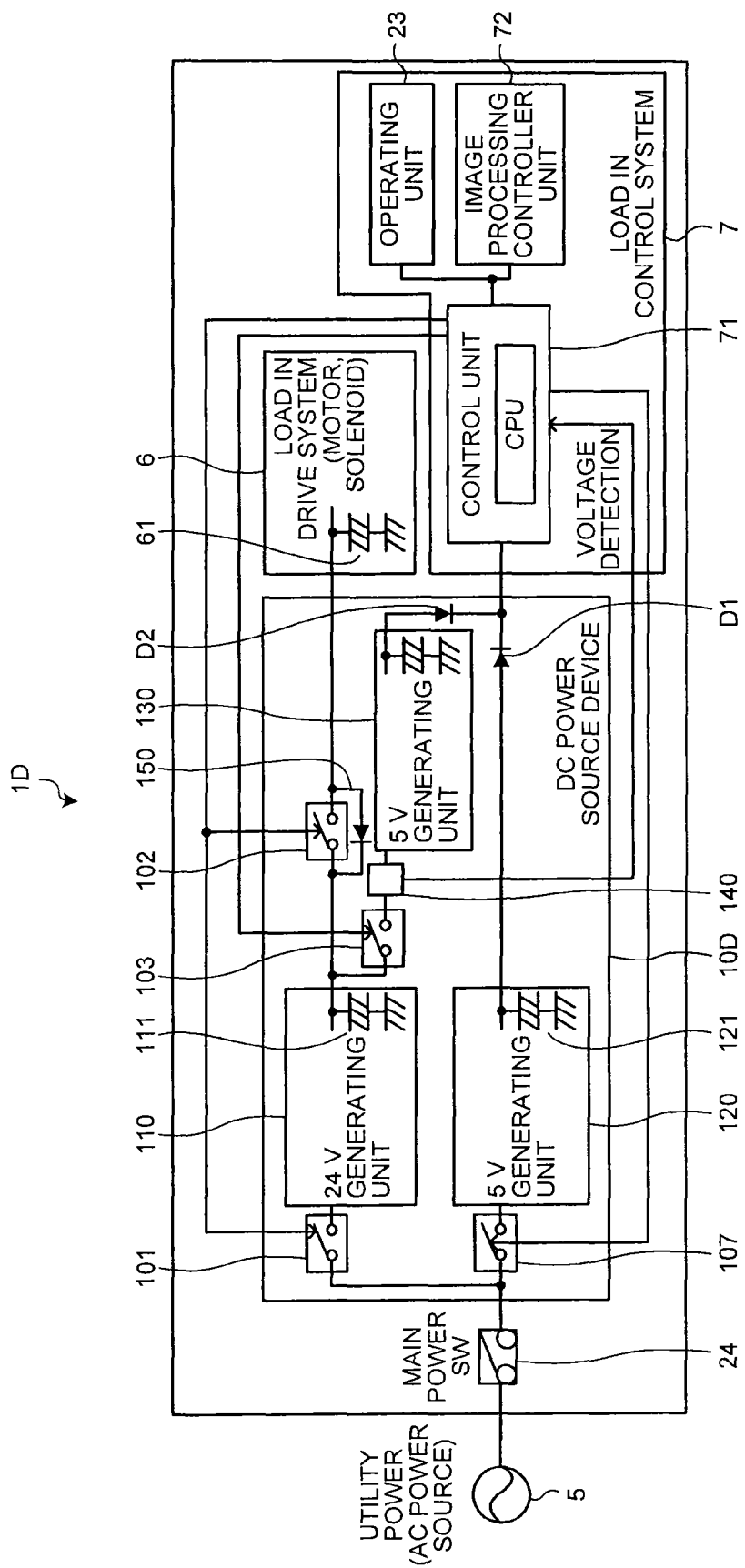
FIG. 10 is a block diagram for explaining the structure and processing operation of the image forming apparatus according to another embodiment.

The structure and processing operation of a image forming apparatus 1D including a DC power source device 10D according to the fifth embodiment, which is modified from the DC power source device 10 illustrated in FIG. 2, will now be described with reference to FIG. 10. FIG. 10 is a block diagram for explaining the structure of the DC power source device 10D, which is modified from the DC power source device 10 illustrated in FIG. 2.

As illustrated in FIG. 10, the difference in the DC power source device 10D from the DC power source device 100 illustrated in FIG. 8 is that a diode (return unit) 150 is provided in parallel with the switch 102. The structure is the same as the DC power source device 100 except for the difference above, and the description of the same structure is omitted.

The diode 150 is provided so as to supply the electric charge (power) stored in an electrolytic capacitor (power storage unit) 61 of the load 6 in the drive system to the 5 V generating unit 130 when the output electric potential of the 24 V generating unit 110 is lower than the input electric potential of the load 6 in the drive system.

That is to say, in the DC power source device 10D, when the magnitude relationship represented by the following formula (1) becomes established between the electric potential of the 24 V generating unit 110 and the electric potential of the load 6 in the drive system, the remaining electric charge (power) stored in the electrolytic capacitor 61 of the load 6 in the drive system is returned to the 24 V generating unit 110.

$$\text{The output part of the 24 V generating unit 110} < \text{The input part of the load 6 in the drive system} \quad (1)$$

Specifically, in the DC power source device 10D, when shift to the power saving mode (sleep mode) takes place, the switch 101 and the switch 102 are turned off by the control unit 71 to stop the voltage generation of the 24 V generating unit 110, the switch 103 is turned from off to on under the control of the control unit 71 in the same manner as in the DC power source device 10 illustrated in FIG. 2 and the DC power source device 10C illustrated in FIG. 8. Then, the remaining electric charge (power) stored in the electrolytic capacitor 111 of the 24 V generating unit 110 is supplied to the 5 V generating unit 130. Then, as the supply of the remaining electric charge (power) stored in the 24 V generating unit 110 is continued, the electric potential in the output unit of the 24 V generating unit 110 is lowered so that the relationship expressed by the formula (1) above becomes established between the difference of the electrical potential in the output unit of the 24 V generating unit 110 and the electrical potential in the input unit of the load 6 in the drive system. At that time, through the diode 150 that is provided in parallel with the switch 102, the remaining electric charge (power) stored in the input part of the load 6 in the drive system, that is, stored in the electrolytic capacitor 61 is returned to the 24 V generating unit 110 and then supplied to the 5 V generating unit 130.

According to the fifth embodiment, the time in which 5 V generating unit 130 can generate the output voltage to be supplied to the load 7 in the control system can be prolonged by the electric charge (power) stored in the electrolytic capacitor 61 of the load 6 in the drive system, thereby achieving resource saving and energy saving.

Exemplary embodiments are described above, however, the present invention is not limited to these embodiments.

For example, the voltage the generation of which is stopped in the power saving mode (sleep mode) is 24 V in the embodiments described above, but this is only one example, and another voltage value, for example, 38 V, 12 V or 5 V may be used.

However, for a copying machine or an MFP among typical image forming apparatuses, the output voltage of a 24 V system is generally used. In addition, an image forming apparatus with a high copying speed, called a high-speed type, for example, a copying machine capable of outputting 60 or more A4-size sheets per minute, has the large enough rated output current value such as 25 A to 50 A in a 24 V system. Corresponding to this, the electrolytic capacitor in the 24 V generating unit has a large capacity, for example, not less than 5000 µF. Accordingly, to apply the present invention to such a copying machine, the 24 V voltage is considered to be the most suitable for the voltage the generation of which is stopped in the power saving mode (sleep mode).

Further, in the embodiments described above, the output voltage generated using the remaining electrical charge (power) stored in the electrolytic capacitor 111 of the 24 V generating unit 110 that stops generating in the power saving mode (sleep mode), is 5 V, however, another voltage value, for example, 1.8 V, 3.3 V or 12 V may be used.

In the embodiments described above, the second load 7 is the load 7 in the control system, however, the embodiment is not limited to this example. Another load in the drive system such as a stepping motor, a brushless motor, or a fan motor can be applied as the second load 7.

In addition, the DC power source device 10 (10A to 10D) in the embodiment described above may include a control unit (controlling unit) to control the 24 V generating unit (the first voltage generating unit) 110 to generate the voltage, or control the various switches (101 to 107, 102A) to turn on and off.

The computer program to perform processing in the control unit 71 or a control unit of the DC power source device 10 (10A to 10D) described above according to the embodiments of the present invention may be provided in a manner installed in a recording unit such as a ROM (not illustrated) in advance. The computer program above may also be provided in a manner recorded in a computer-readable recording medium in an installable or executable file format. The computer program above may also be provided or distributed over a network such as the Internet.

In the embodiments described above, an example in which the present invention is applied to an image forming apparatus is described. However, the embodiment is not limited to this example. The present invention can be applied to any electronic device that includes a first voltage generating unit that supplies a first voltage of 24 V, for example, to the load in the drive system such as a motor, and a second voltage generating unit that supplies a second voltage of 5 V, for example, to the load in the control system such as the control unit based on the power supplied from the power source.

According to the present invention, resource saving and energy saving can be achieved by utilizing the power remaining in a storage unit rather than wasting the power.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power source device comprising:
   a first voltage generating unit that includes a power storage unit storing power based on power supplied from a power source and generates a voltage to be supplied to a first load based on the power supplied from the power source; and
   a second voltage generating unit that generates a voltage to be supplied to a second load based on the power stored in the power storage unit when the first voltage generating unit is controlled to stop generation.

2. The power source device according to claim 1, further comprising a third voltage generating unit that includes a power storage unit storing power based on the power supplied from the power source and generates a voltage to be supplied to the second load based on the power supplied from the power source, wherein
   in a first operation mode, a voltage is supplied from the first voltage generating unit to the first load, and a voltage is supplied from the third voltage generating unit to the second load; and
   when shift from the first operation mode to a second operation mode takes place, the first voltage generating unit is controlled to stop generation, voltage supply from the first voltage generating unit to the first load is shut off, and the second voltage generating unit supplies a voltage to the second load based on the power stored in the power storage unit of the first voltage generating unit; and a voltage is supplied from the third voltage generating unit to the second load when a value of a voltage supplied from the second voltage generating unit to the second load becomes lower than a predetermined value.

3. The power source device according to claim 2, wherein the second operation mode is a power saving mode to reduce power consumption in a stand-by state of an electronic device in which the power source device is provided.

4. The power source device according to claim 1, further comprising:
   a first switching unit that turns on and off a path to supply power from the first voltage generating unit to the first load; and
   a second switching unit that turns on and off a path to supply a voltage from the first voltage generating unit to the second voltage generating unit, wherein
   when the first voltage generating unit is controlled to stop generation, the first switching unit is turned from on to off and the second switching unit is turned from off to on.

5. The power source device according to claim 4, further comprising a third switching unit that turns on and off a path to supply power from the power source to the first voltage generating unit, wherein
   the third switching unit is turned to off to stop generation by the first voltage generating unit.

6. The power source device according to claim 2, further comprising a path where output of the second voltage generating unit and output of the third voltage generating unit are joined together to supply a voltage to the second load, wherein
   a value of a voltage generated by the second voltage generating unit is set so as to be larger than a value of a voltage generated by the third voltage generating unit.

7. The power source device according to claim 2, further comprising:
   a path where output of the second voltage generating unit and output of the third voltage generating unit are joined together to supply a voltage to the second load;
   a fourth switching unit that turns on and off a path from the second voltage generating unit to a point at which the outputs are joined; and
   a fifth switching unit that turns on and off a path from the third voltage generating unit to the point, wherein
   when the first voltage generating unit is controlled to stop generation, the fifth switching unit is turned from on to off and the fourth switching unit is turned from off to on; and when a predetermined time has elapsed since the fourth switching unit is turned to on, the fourth switching unit is turned to off and the fifth switching unit is turned to on.

8. The power source device according to claim 2, further comprising:
   a voltage detection unit that detects a value of a voltage supplied to the second voltage generating unit; and
   a sixth switching unit that turns on and off a path to supply power from the power source to the third voltage generating unit, wherein
   when the first voltage generating unit is controlled to stop generation and a voltage is supplied from the power storage unit of the first voltage generating unit to the second voltage generating unit, and when the value detected by the voltage detection unit is equal to or more than a predetermined value, the sixth switching unit is turned to off; when the value detected by the voltage detection unit becomes less than the predetermined value, the sixth switching unit is turned from off to on.

9. The power source device according to claim 1, wherein the first load includes a power storage unit that stores power based on the voltage supplied from the first voltage generating unit, and
   the power source device further comprises a return unit that returns the power stored in the power storage unit of the first load to the first voltage generating unit to supply the power to the second voltage generating unit, when output electric potential of the first voltage generating unit is lower than input electric potential of the first load.

10. The power source device according to claim 5, wherein when it is detected that a cover of an electronic device in which the power source device is provided is opened, the first switching unit and the third switching unit are turned from on to off and the second switching unit is turned from off to on.

11. The power source device according to claim 1, wherein the power storage unit of the voltage generating unit is provided to supply a voltage stably to the load if an instantaneous power interruption occurs.

12. The power source device according to claim 1, wherein
the first load is a load in a drive system; and
the second load is a load in a control system that includes at least a control unit controlling operation of the load in the drive system.

13. An electronic device comprising:
the power source device according to claim 1; and
the first load and the second load that operate based on a voltage supplied from the power source device.

14. The electronic device according to claim 13, wherein
the first load is a load in a drive system; and
the second load is a load in a control system that includes at least a control unit controlling operation of the power source device and the load in the drive system.

15. An image forming apparatus comprising:
the power source device according to claim 1; and
the first load and the second load that operate based on a voltage supplied from the power source device.

16. The image forming apparatus according to claim 15, wherein
the first load is a load in a drive system; and
the second load is a load in a control system that includes at least a control unit controlling operation of the power source device and operation relating to image forming of the load in the drive system.

17. A power source control method executed by an electronic device that comprises:
a first load and a second load;
a first voltage generating unit that comprises a power storage unit storing power based on power supplied from a power source and generates a voltage to be supplied to the first load based on the power supplied from the power source;
a second voltage generating unit that generates a voltage to be supplied to the second load based on the power stored in the power storage unit; and
a control unit,
the power source control method comprising:
controlling, by the control unit, the second voltage generating unit to generate a voltage to be supplied to the second load based on the power stored in the power storage unit when the first voltage generating unit is controlled to stop generation.

18. The power source control method according to claim 17, wherein
the electronic device is an image forming apparatus including:
a load in a drive system as the first load that performs operation relating to image formation based on the voltage supplied from the power source device; and
a load in a control system that includes at least the control unit controlling operation relating to image formation of the load in the drive system, as the second load.

\* \* \* \* \*